Patented Sept. 6, 1932

1,875,932

UNITED STATES PATENT OFFICE

JOHN PARSONS, OF MONTCLAIR, NEW JERSEY, AND JORDAN HOMER STOVER, OF MOUNT KISCO, NEW YORK, ASSIGNORS, TO PAN-ROSS LABORATORIES, INC., OF BELLEVILLE, NEW JERSEY, A CORPORATION OF NEW YORK

FUSE COMPOSITION

No Drawing. Application filed May 6, 1930. Serial No. 450,306.

This invention relates to new and useful improvements in compositions for fuses and similar readily ignitible substances. Its object is the provision of a new composition which will burn without producing obnoxious fumes and which may be produced in the form of a very thin sheet or ribbon which may be satisfactorily used as a band to be applied to the end of cigarettes, cigars or little cigars, which together with a fulminate will make the same self-lighting as described in the application of John Parsons, Serial No. 34,510, filed June 3, 1929. It likewise is capable of many other uses.

The invention consists of the novel composition hereinafter described and claimed, and, while the same is described in its preferred form, it is not intended that the invention be limited to such form but the scope thereof is as set forth in the claims.

The fuse composition comprises a combustible coal-forming substance and an oxidizing substance held together by a binder which is itself a transporter of combustion. In the preferred composition, the ingredients are wood flour, sawdust or other coal-forming combustibles, potassium nitrate and nitrocellulose. The proportions of these ingredients may be varied as fuses or fuse bands of different characteristics are required, but we have found that the composition hereafter described in detail is highly satisfactory.

One hundred parts by weight of nitrated cotton are dissolved in two hundred parts by weight of a solvent, such as that commonly used in the preparation of nitrocellulose lacquers. The solvent which we prefer to use consists of seventy-five parts of ethyl acetate, twenty-five parts of acetone, seventy-five parts of alcohol and twenty-five parts of benzol, although other solvents may be used. The solution thus obtained is of paste-like consistency and to it we add eighty parts by weight of sawdust or wood flour and twenty parts by weight of potassium nitrate. The ingredients are then mixed into dough by means of a dough mixer of well-known type. Friction developed during the mixing operation heats the dough up to about 100° F., and the dough is maintained at this temperature while being worked, the dough being more workable at this temperature than it would be at lower temperatures. After the ingredients have been thoroughly mixed, fifteen per cent. by weight of water is added and stirred into it. The addition of the water frees the dough from the mixer, makes it more freely workable in the subsequent treatment to which it is put. The mixture is transferred to the hopper which is maintained at 100° F., and from the hopper the mixture is fed to a rolling machine in which it is rolled into a thin sheet and dried. There remains in the finished product approximately twenty per cent. of solvent, which makes the sheet sufficiently flexible that it may be manipulated as is required to apply a band of the same to the end of a cigarette. Such a fuse composition may be produced in the form of sheets of approximately ten-thousandths of an inch thick and of sufficient flexibility and strength that bands thereof may be applied to the ends of cigarettes by means of machines such as are now used for applying cork tips or the like to cigarettes.

As far as we are aware, the use of nitrocellulose or other plastic binder for a comminuted combustible substance impregnated with an oxidizing agent is new in compositions for use as fuses, and particularly is it new to provide such a composition which is capable of being formed into a film, sheet or ribbon. The nitrocellulose in the composition acts as a binder for the other materials and likewise as an aid to combustion and as a transporter of combustion itself. It is further an odorless moisture-proofing material which seals the oxidizing substance and the wood flour in the mixture from dampness. On account of these characteristics, the composition is particularly adapted for use as fuse bands to be applied to cigarettes for the purpose of making the same self-lighting and resisting humid conditions.

While the use of nitrocellulose above described is a preferred way of making the composition, it is possible to accomplish similar results by using other plastic compositions of nitrocellulose, either alone or mixed with various oils, resins or other similar ingredients. It is possible also to form a binder having somewhat similar characteristics made without nitrocellulose, if the materials used are provided with suitable oxidizing agents mixed therewith to render the same inflammable and self-oxidizing. Nitrocellulose is itself a material having the characteristic of being self-combustible, odorless and self-oxidizing. Our invention resides in part in the discovery that a comminuted or fibrous coal-forming substance combined with suitable oxidizers and held together by a binding material itself a transporter of combustion and capable of self-contained combustion provides a fuse composition having peculiar characteristics and special advantages as above enumerated.

This application is a continuation in part of our copending application Serial Number 54,797, filed September 5, 1925.

We claim:—

1. A fuse composition of the character described, said composition having as its constituents a coal-forming combustible and an oxidizer distributed through a nitro cellulose binder, said binder being in excess of either the combustible or the oxidizer.

2. A fuse composition of the character described, said composition having as its constituents a coal-forming combustible and an oxidizer distributed through a nitro cellulose binder, said combustible being materially in excess of said oxidizer.

3. A fuse composition of the character described comprising four parts of a coal-forming combustible, one part of an oxidizer and five parts of a nitro cellulose binder in which said combustible substance and oxidizer are uniformly distributed.

4. A fuse composition of the character described comprising a coal-forming combustible and an oxidizer distributed through a nitro cellulose binder, said combustible being materially in excess of said oxidizer and said binder being substantially equal to the sum of the other two.

5. A fuse composition of the character described comprising a coal-forming combustible, an oxidizing substance, and a nitro cellulose binder through which the other substances are uniformly distributed, said binder being approximately equal to the sum of the other ingredients.

6. A thin flexible fuse of the character described comprising a coal-forming combustible and an oxidizing substance distributed through a nitro cellulose binder.

7. A thin flexible fuse of the character described comprising a coal-forming combustible and an oxidizing substance distributed through a nitro cellulose binder, said combustible substance being materially in excess of said oxidizing substance.

8. A thin flexible fuse of the character described comprising a coal-forming combustible and an oxidizing substance distributed through a nitro cellulose binder, said binder being in excess of either of the other two substances.

9. A thin flexible fuse composition for use in connection with self-lighting cigars, cigarettes and the like comprising a coal-forming combustible substance and an oxidizing substance distributed through a nitro cellulose binder, said binder constituting approximately one-half of the composition.

10. A fuse composition comprising wood flour and potassium nitrate distributed through a nitrocellulose binder, said binder being in excess of either the wood flour or potassium nitrate.

11. A fuse composition comprising wood flour and potassium nitrate distributed through a nitrocellulose binder, said wood flour being materially in excess of said potassium nitrate.

12. A fuse composition comprising four parts of wood flour, one part of potassium nitrate and five parts of nitrocellulose through which the wood flour and potassium nitrate are distributed.

13. A fuse composition comprising wood flour and potassium nitrate distributed through nitrocellulose, said wood flour being materially in excess of said potassium nitrate and said nitrocellulose being substantially equal to the sum of the other two.

14. A fuse composition comprising wood flour and potassium nitrate distributed through nitrocellulose, said nitrocellulose being approximately equal to the sum of the wood flour and potassium nitrate.

15. A paper-like fuse of the character described comprising wood flour and potassium nitrate distributed through a binder of nitrocellulose.

16. A paper-like fuse of the character described comprising wood flour and potassium nitrate distributed through a nitrocellulose binder, said wood flour being materially in excess of said potassium nitrate.

17. A paper-like fuse of the character described comprising wood flour and potassium nitrate distributed through a nitrocellulose binder, said binder being in excess of either of the other two substances.

18. A paper-like fuse of the character described comprising wood flour and potassium nitrate distributed through a nitrocellulose binder, said binder constituting approximately one-half of the composition.

In testimony whereof, we have signed our names to this specification.

JOHN PARSONS.
JORDAN HOMER STOVER.